3,014,007
COMPOSITION COMPRISING AN EPOXY RESIN, AN ANILINE-FORMALDEHYDE RESIN, A LIQUID POLYSULFIDE POLYMER AND A PHENOLIC CURING ACCELERATOR
John S. King, Chandlersford, and Robert McDowall, Southampton, England, assignors to The Borden Company, New York, N.Y., a corporation of New Jersey
No Drawing. Filed Nov. 3, 1958, Ser. No. 771,181
Claims priority, application Great Britain May 9, 1958
3 Claims. (Cl. 260—45.2)

This invention is for improvements in or relating to curing agents for epoxide resins and has for an object the provision of a curing agent of very low toxicity, effective at room temperature.

The "epoxide resin" to be used is any glycidyl ether formed by the reaction of a polyhydric organic compound, either aromatic or aliphatic, with a compound having a glycidyl radical or a group capable of forming a glycidyl radical under the conditions of the reaction, the said resin having an "epoxy equivalency" of greater than unity. By the term "epoxide equivalency" we mean the average number of 1,2 epoxy groups

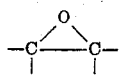

contained in the molecule of the glycidyl ether.

Epoxide resins have hitherto been cured with various amines including primary polyamines and tertiary amines. The use of aniline-formaldehyde resins as curing agents has also been proposed. These resins impart a higher heat resistance to the cured epoxide resin than is obtained with the amines hereinbefore mentioned. They have the disadvantage, however, of being semi-solid or solid, and require to be heated to temperatures of the order of 50° C. before mixing with the epoxide resin which has previously been similarly heated. The pot life of such a composition at 50° C. is quite short and, because of differential contraction on cooling, it is difficult to make accurate castings with it.

The present invention provides a curing agent for epoxide resins comprising an admixture of an aniline-aldehyde resin with a liquid polysulfide polymer and, for best results, also with a phenol accelerator.

The polysulfide polymer used is a liquid bifunctional mercaptan. Examples that illustrate this class of compounds are an olefin polysulfide polymer such as Thiokol LP3 of molecular weight 300–4,000 and of the approximate formula $$HS.(C_2H_4O.CH_2.O.C_2H_4.S.S.)_6.C_2H_4.O.CH_2.O.C_2H_4.SH$$

having bifunctionality due to the two terminal mercapto groups and having some cross linking due to the inclusion of about 1%–3% of trichloropropane with the bis(2-chloroethyl) formal during the reaction with sodium polysulfide, to make the Thiokol LP3; HS-terminated polymeric ethylene polysulfide; and the corresponding propylene polymers.

Such liquid polysulfide polymers impart a high impact strength to cured epoxide resin castings but have the disadvantage of lowering the ASTM heat distortion point as determined by method D.658–45T of these castings. However, if these polymeric polysulfide modifiers are used in suitable amounts with aniline-formaldehyde resin or the like curing agents, the heat resistance is greater than that obtainable with the conventional polyamine curing agents. The impact strength is also much improved. Moreover, it has been found that homogeneous mixtures are formed by adding aniline-formaldehyde resins to the polysulfide polymer if both have previously been heated to approximately 50° C. A suitably balanced mixture remains liquid on cooling and thus a combined hardener-modifier composition results. This combined hardener-modifier composition, however, has the disadvantage that it requires a period of days to cure an epoxide resin at room temperature.

The aniline-formaldehyde type resin may be the product of condensation, under usual conditions, of aniline itself, toluidine, or amino ethyl benzene $$C_6H_4(NH_2).C_2H_5$$

with formaldehyde, furfural, or the like.

The phenol used to accelerate the cure may be phenol $C_6H_5OH$, one of the cresols such as m- or p-, xylenol, or any one shown in Example 1. By the use of the correct type and percentage of phenolic compound, pot lives from a few minutes to several days can be obtained. Moreover, such phenolic compounds, dispersed in the combined hardener-modifier composition, give rise to a homogeneous liquid curing agent-modifier-accelerator composition.

The properties of the curing agent of this invention are modified by variation of any one or more of the ingredients or of their relative proportions. Thus the heat resistance is improved by the use of a low aniline-to-formaldehyde ratio in the aniline-aldehyde resin. A suitable molar ratio of aniline, or chloro- or alkyl-substituted aniline, to formaldehyde is from 1:0.5 to 1:1.5, preferably 1:0.65 to 1:1.09; the resin is preferably prepared under acid conditions and then is substantially dehydrated. The impact strength is improved and the elongation to break increased if the ratio of the aniline-formaldehyde resin to the liquid polysulfide polymer is decreased. The preferred amount of the polysulfide polymer is from 14% to 270% by weight of the aniline-formaldehyde resin. The pot life can also be adjusted to requirements by the use of the correct type and percentage of phenolic compound and the amount used is preferably from 3% to 100% by weight of the aniline-formaldehyde resin.

Provided the aniline-formaldehyde resin contain virtually no free aniline and that the phenolic accelerator is properly chosen, the curing agent of this invention has a very low toxicity.

In use, the curing agent is employed in a proportion such as to provide an amount of aniline-formaldehyde resin of 20%–50% by weight of the epoxide resin.

The following examples illustrate the invention and the manner in which it may be carried out.

*Example 1*

This example illustrates the effect on the pot life of an epoxide resin composition of varying admixed phenols therewith, as accelerators of curing. The epoxide resin used was the reaction product of epichlorhydrin with diphenylol propane. Other polysulfides that may be used are the ether-olefin polysulfides such as the reaction product of 2′,2′-dichloroethyl ether with sodium polysulfide. The aniline to formaldehyde ratio of the aniline-formaldehyde resin was 1/0.67.

The epoxide resin composition contained 100 parts by weight of the epoxide resin and 66 of the curing agent consisting of:

| | Parts by weight |
|---|---|
| Aniline-formaldehyde resin | 40 |
| Thiokol LP3, M.W. 1,000 | 20 |
| Phenols—see below | Equiv. to 6 of phenol |

The pot lives of compositions thus prepared were determined by noting the time taken by 50 g. samples to gel, the samples in their containers being maintained at a constant temperature of 70° F. on a water bath. The following table shows the results obtained:

| Phenol used: | Pot life |
|---|---|
| Phenol | 2 hours, 43 minutes. |
| Resorcinol | 1 hour, 10 minutes. |
| Phenol-o-sulfonic acid | 2 hours, 53 minutes. |
| α-Phenyl phenol | 4 hours, 5 minutes. |
| Pentachlorophenol | 2 hours, 20 minutes. |
| Pyrogallol | 1 hour, 47 minutes. |
| Meta-cresol | 3 hours. |
| Catechol | 2 hours, 30 minutes. |
| Phloroglucinol | 1 hour, 40 minutes. |

It was found that the curing agents described above were all sufficiently fluid to enable them to be easily incorporated in the epoxide resin at 70° F. to give a homogeneous composition. The curing agent prepared with meta-cresol, for example, had a viscosity of 190 poises at 25° C. and that prepared with phenol a viscosity of 199.42 poises at 25° C.

*Example 2*

A combined hardener-modifier composition was prepared from 40 parts by weight of the aniline-formaldehyde resin used in Example 1, 20 parts by weight of the liquid polysulfide Thiokol LP3, and 12 parts by weight of resorcinol. Prior to the addition of the liquid polysulfide, the aniline resin was semi-solid material. The viscosity of the composition, which was prepared by mixing the three ingredients together at a temperature of 50° C. and then allowing to cool, was 1300 poises at 25° C. as measured with a Ferranti viscometer.

A mixture was prepared by mixing together 100 parts by weight of the epoxide resin used in Example 1 with 72 parts by weight of the hardener-modifier composition above referred to as curing agent.

The properties of the mix were that in amounts of 50 grams the pot life was 1 hour, whilst the pot life of a mix weighing 1 pound was 40 minutes.

After the mix had gelled at room temperature and had been cured for 1 hour at 120° C., its heat distortion was 92° C. when tested in accordance with the American Society of Testing Materials Specification No. D.648–45T. The Barcoll hardness was 40, the flexural strength was 11,200 pounds per square inch, and the impact strength of a notched specimen was 0.125 foot pounds when tested in a Hounsfield Impact Tester.

*Example 3*

A epoxide resin was prepared by the action of epichlorhydrin on a phenol-formaldehyde novolak resin. The epoxide resin, which contained some phenyl glycidyl ether produced from the free phenol present in the novolak resin, had an epoxide value of 0.5 epoxide groups per 100 g. and a viscosity of 43 poises at 25° C.

Three curing agents were then prepared as follows:

| | Grams |
|---|---|
| Curing Agent A: | |
| Thiokol LP3 | 5 |
| Aniline-formaldehyde resin | 10 |
| Curing Agent B: | |
| Thiokol LP3 | 5 |
| Aniline-formaldehyde resin | 10 |
| Phenol | 1.5 |
| Curing Agent C: | |
| Thiokol LP3 | 5 |
| Aniline-formaldehyde resin | 10 |
| Meta-cresol | 1.7 |

Using these curing agents (in which the aniline resin is that referred to in Example 1) in the amounts indicated with 25 g. of the epoxide resin, the following pot lives were obtained at 80° F.:

Curing Agent A: Longer than 6½ hours.
Curing Agent B: 3 hours, 57 minutes.
Curing Agent C: 4 hours, 24 minutes.

*Example 4*

The procedure and composition of any one of the Examples 1–3 is followed except that the epoxy resin there used is replaced by epoxidized bis-phenol A (diphenylol propane) of 1,2-epoxy equivalency greater than 1.

*Example 5*

The procedure and composition of any of the Examples 1–4 are used except that the polysulfide there used is replaced by an equal weight of any of the other polymeric polysulfides disclosed herein.

We have found that the hardener compositions provided by this invention produce cured epoxide resins superior to those made with amine hardeners when the curing is effected in the presence of water.

It is to be understood that it is intended to cover all changes and modifications of the examples of the invention herein chosen for the purpose of illustration which do not constitute departures from the spirit and scope of the invention.

We claim:

1. A room-temperature-curing epoxide resin composition comprising a homogeneous mixture of a glycidyl ether of a polyhydric phenol having at least one 1,2-epoxy group to the molecule of the ether, an aniline formaldehyde resin having therein 0.5–1.5 moles of formaldehyde to 1 mole of aniline, a liquid polysulfide polymer that is a bifunctional mercaptan, and an accelerator of curing of the said composition selected from the group consisting of phenol, m-xylenol, p-xylenol, m-cresol, resorcinol, pentachlorophenol, alpha-phenylphenol, pyrogallol, catechol, phloroglucinol, and phenol-sulfonic acid, the proportions by weight being 20–50 parts of the aniline-formaldehyde resin for 100 parts of the glycidyl ether and, for 100 parts of the aniline-formaldehyde resin, 3–100 parts of the said accelerator and 14–270 parts of the polysulfide.

2. The composition of claim 1, the said accelerator being phenol.

3. The composition of claim 1, the said glycidyl ether being the reaction product of epichlorohydrin with diphenylolpropane.

References Cited in the file of this patent

UNITED STATES PATENTS 2,703,765 Osdal _____ Mar. 8, 1955

FOREIGN PATENTS 730,670 Great Britain _____ May 25, 1955

OTHER REFERENCES

Bishop: "Journal Applied Chemistry," vol. 6, June 1956, pages 256–260.